United States Patent

Breese

Patent Number: 5,643,093
Date of Patent: *Jul. 1, 1997

[54] ALUMINUM DRIVESHAFT HAVING REDUCED DIAMETER END PORTION

[75] Inventor: Douglas E. Breese, Northwood, Ohio

[73] Assignee: Dana Corporation, Toledo, Ohio

[*] Notice: The term of this patent shall not extend beyond the expiration date of Pat. No. 5,637,042.

[21] Appl. No.: 545,481

[22] Filed: Oct. 19, 1995

[51] Int. Cl.⁶ ............................... F16C 3/02
[52] U.S. Cl. ........................... 464/183; 464/134
[58] Field of Search ...................... 464/179, 182, 464/183, 172, 128, 130, 135, 175, 181; 403/309, 298

[56] References Cited

U.S. PATENT DOCUMENTS

| | | | |
|---|---|---|---|
| 2,559,485 | 7/1951 | Warner | 464/136 X |
| 3,479,030 | 11/1969 | Merola . | |
| 3,854,316 | 12/1974 | Wilson . | |
| 4,358,284 | 11/1982 | Federmann et al. | 464/183 |
| 4,527,978 | 7/1985 | Zackrisson . | |
| 4,561,799 | 12/1985 | Arena . | |
| 4,788,841 | 12/1988 | Calhoun et al. | |
| 5,320,579 | 6/1994 | Hoffmann | 464/183 X |
| 5,397,272 | 3/1995 | Smiley et al. | 464/183 X |

Primary Examiner—Daniel P. Stodola
Assistant Examiner—Eileen A. Dunn
Attorney, Agent, or Firm—MacMillan, Sobanski & Todd

[57] ABSTRACT

A driveshaft includes a center portion having a larger diameter, an end portion having a reduced diameter, and a diameter reducing portion positioned between the center and end portions. The reduced diameter end portion of the driveshaft is secured to a reduced diameter tube yoke. This facilitates the introduction of tooling during assembly of a universal joint. The driveshaft is formed by a method which involves first heat treating the driveshaft to a relatively soft temper, then swaging the end portion of the driveshaft, and then heat treating the driveshaft again to a relatively hard temper. In more detail, a driveshaft is provided having a predetermined first diameter, the driveshaft being heat treated to achieve a relatively soft temper so as to possess a desired elongation factor. This allows the end portion of the driveshaft to be swaged to reduce the diameter thereof to a second predetermined diameter. After swaging, the driveshaft is heat treated again to achieve a relatively hard temper to meet the strength requirements for use.

7 Claims, 2 Drawing Sheets

5,643,093

ALUMINUM DRIVESHAFT HAVING REDUCED DIAMETER END PORTION

BACKGROUND OF THE INVENTION

This invention relates in general to drive train assemblies for transferring rotational power in vehicles. In particular, this invention relates to an improved structure for an aluminum driveshaft tube for transmitting rotational power from an engine to an axle assembly in a vehicle.

In most land vehicles in use today, a drive train assembly is provided for transmitting rotational power from an output shaft of an engine/transmission assembly to an input shaft of an axle assembly so as to rotatably drive the wheels of the vehicle. To accomplish this, a typical vehicular drive train assembly includes a hollow cylindrical driveshaft tube. A first universal joint is connected between the output shaft of the engine/transmission assembly and the driveshaft tube, while a second universal joint is connected between the driveshaft tube and the input shaft of the axle assembly. The universal joints provide a rotational driving connection from the output shaft of the engine/transmission assembly through the driveshaft tube to the input shaft of the axle assembly, while accommodating a limited amount of misalignment between the rotational axes of these three shafts.

It is known that when any mechanical body is rotated about an axis, a natural resonant frequency is defined thereby. This natural resonant frequency is an inherent characteristic of the mechanical body and is based upon many factors, including its composition, size, and shape. When the mechanical body is rotated at a speed which is at or near its natural resonant frequency, a relatively large amount of vibration can occur. In the context of a vehicular driveshaft tube, the natural resonant frequency is often referred to as the "critical speed" thereof. Thus, when a driveshaft tube is rotated at or near its critical speed, it can begin to vibrate excessively. Such vibration can, at a minimum, generate undesirable noise in the vehicle during operation. More seriously, this vibration can cause excessive stresses and rapid failure of not only the driveshaft tube, but the other components of the drive train assembly connected thereto. Accordingly, an important consideration in the design and manufacture of driveshaft tubes and other drive train assembly structures is that they not be operated at or near their critical speeds in normal operation.

Thus, the critical speed for a driveshaft tube is a function of, among other things, the nature of the material used to form the driveshaft tube. Generally speaking, the lighter the material used to form the driveshaft, the lower the critical speed. Traditionally, vehicular driveshaft tubes have been formed from steel alloys. Steel alloys have been found to be acceptable materials not only because they possesses sufficient strength to transmit the rotational loads which are normally encountered during use, but also because they are relatively heavy and stiff materials. As a result, the critical speed of steel alloy driveshaft tubes is usually sufficiently high that it is not encountered during normal operation of the vehicle. Unfortunately, because they are relatively heavy materials, steel alloys contribute an undesirable amount to the overall weight of the vehicle. To address this, driveshaft tubes have more recently been formed from lighter weight alternative materials, such as aluminum alloys. Aluminum alloys have been found to be desirable for use in vehicular driveshaft tubes because they are much lighter than steel alloys, yet possess sufficient strength to transmit the rotational loads therethrough. Unfortunately, for this same reason of lighter weight, the critical speed of an aluminum alloy driveshaft tube is usually much lower than the critical speed of a comparably sized steel alloy driveshaft tube. The critical speeds of typical aluminum alloy driveshaft tubes have been found to be undesirably close to the normal operating speeds of the vehicle than comparable steel alloy driveshaft tubes.

As mentioned above, the critical speed for a driveshaft tube is also a function of the size and shape of the driveshaft tube. Generally speaking, the longer the driveshaft tube is in length and the smaller it is in diameter, the lower the critical speed. The use of aluminum alloys has allowed the replacement of traditional two-piece steel alloy driveshaft tubes with newer one-piece aluminum alloy driveshaft tubes. The newer one-piece driveshaft tubes are preferable to the traditional two-piece steel alloy driveshaft tubes because fewer parts are required. However, because they are longer in length, one-piece aluminum alloy driveshaft tubes have a lower critical speed than a comparably sized two-piece steel alloy driveshaft tubes, undesirably close to the normal operating speeds of the vehicle than comparable steel alloy driveshaft tubes.

Attempts have been made to alter the critical speed of one-piece aluminum alloy driveshaft tubes to facilitate their use in vehicles. For example, it is known that the critical speed of an aluminum alloy driveshaft can be increased by covering it with a coating of a high strength material, such as a resin matrix reinforced with graphite fibers. Though effective, the use of such a covering undesirably increases manufacturing costs. It would be advantageous, therefore, to provide an improved structure for a driveshaft tube which would enable the use of lighter weight aluminum alloys, yet would not require the use of relative expensive reinforcing coatings to raise the critical speed thereof above the normal operating speed of the vehicle.

SUMMARY OF THE INVENTION

This invention relates to an improved structure for a vehicular driveshaft tube which enables the use of lighter weight aluminum alloys, yet which has a critical speed which is sufficiently high as to not be encountered during normal use of the vehicle. A new driveshaft has now been developed which permits the use of a larger diameter driveshaft while still allowing the requisite access for the tooling needed to assemble the universal joints. By using a larger diameter driveshaft, the driveshaft can be formed from an aluminum alloy and yet not require an expensive reinforcing coating. The increase in the driveshaft diameter will increase the critical speed to a commercially acceptable level. In order to enable the use of a larger diameter driveshaft while still allowing the requisite access for the tooling to put together the universal joints, there is a diameter reduction which provides a conversion from the larger diameter driveshaft to a reduced diameter tube yoke. This invention provides this diameter reduction by forming a driveshaft with a center portion having a larger diameter and an end portion having a reduced diameter. A diameter reducing portion of the driveshaft is positioned between the center portion and the end portion. The reduced diameter end portion of the driveshaft is secured to the reduced diameter tube yoke. This facilitates the introduction of tooling to the lug bolts during assembly of the universal joint. The driveshaft of the invention is formed by a method which involves first heat treating the driveshaft to a relatively soft temper, then swaging the end portion of the driveshaft to reduce the diameter thereof, and then heat treating the driveshaft again to a relatively hard temper. In more detail, a driveshaft is provided having a predetermined first diameter, the driveshaft being heat treated to achieve a relatively soft temper so as to possess a desired elongation factor. This allows the end portion of the driveshaft to be swaged to reduce the diameter thereof to a second predetermined diameter. After the swaging operation, the driveshaft is heat treated again (referred to as "aging") to achieve a relatively hard temper to meet the strength requirements for use.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
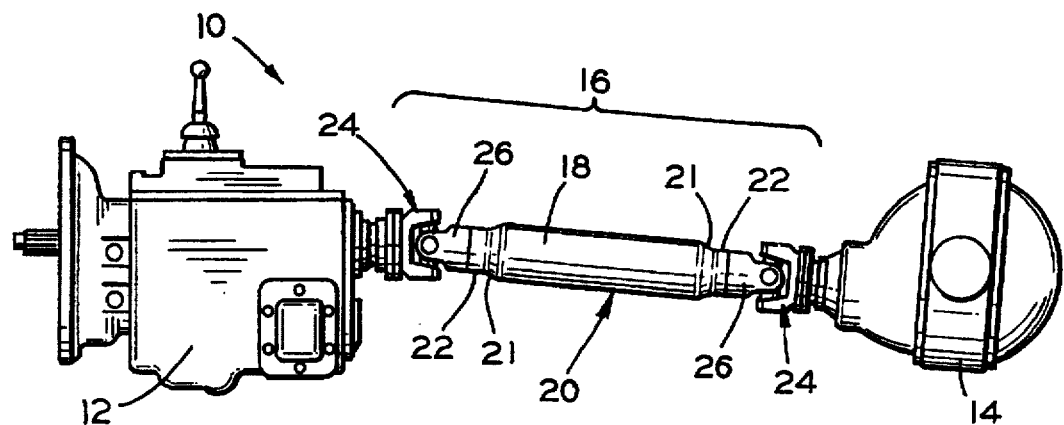
FIG. 1 is a side elevational view schematically illustrating a vehicle drive train including an improved driveshaft in accordance with this invention.

Referring now to the drawings, there is illustrated in FIG. 1 a vehicle drive train assembly, indicated generally at 10. The drive train assembly 10 includes a transmission 12 having an output shaft (not shown) which is connected to an input shaft (not shown) of an axle assembly 14 through a driveshaft assembly 16. The transmission 12 is rotatably driven by an engine (not shown) which generates rotational power in a conventional manner. The driveshaft assembly 16 includes a cylindrical driveshaft tube 18 having a center portion 20 and opposing end portions 22. As will be explained in greater detail below, the center portion 20 of the driveshaft tube 18 is formed having a larger outer diameter than either of the end portions 22. Thus, a transition region 21 is defined between the larger diameter center portion 20 of the driveshaft 18 and each of the smaller diameter end portions 22 thereof.

Figure 3:
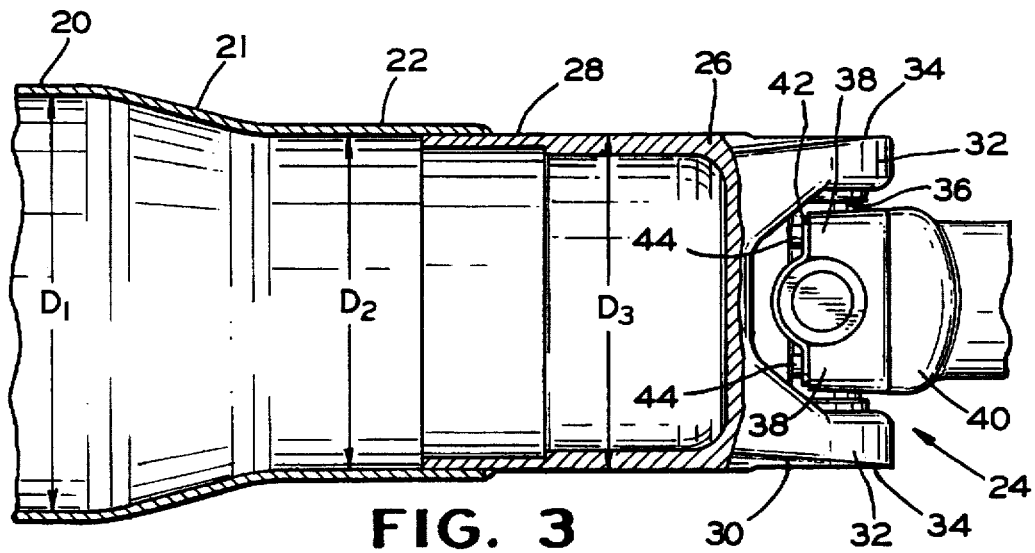
FIG. 3 is a top plan view (rotated 90 degrees from FIGS. 1 and 2), partially in cross section of one end of a driveshaft in accordance with this invention connected to a tube yoke, and the tube yoke connected to a universal joint.

The output shaft of the transmission 12 and the input shaft of the axle assembly 14 are typically not co-axially aligned. To accommodate this, a universal joint, indicated generally at 24, is provided at each of the end portions 22 of the driveshaft tube 18 to rotatably connect the driveshaft tube 18 to the output shaft of the transmission 12 and the input shaft of the axle assembly 14. FIG. 3 illustrates the universal joint 24 provided between the end portion 22 of the driveshaft tube 18 and the input shaft of the axle assembly 14. As shown therein, the universal joint 24 includes a tube yoke 26 which is secured to the end portion 22 of the driveshaft tube 18. The tube yoke 26 is formed having a tube seat 28 at one end and a lug structure 30 at the other end. The tube seat 28 is adapted to be secured to the end portion 22 of the driveshaft 18 to enable torque to be transmitted between the driveshaft tube 18 and the tube yoke 26. The tube seat 28 defines an outer diameter $D_3$ which will be discussed below.

The illustrated tube yoke 26 is a full round yoke, wherein the lug structure 30 includes a pair of opposed lug ears 32 having co-axially aligned cross holes 34 formed therethrough. The cross holes 34 are provided to receive two opposed bearing caps mounted on respective trunnions of a cross 36 (see FIG. 3) in a well known manner. The other two trunnions of the cross 36 are connected to lug ears 38 provided on an end yoke 40 connected to the input shaft of the axle assembly 14. The illustrated end yoke 40 is a half round yoke, including a pair of straps 42 (only one is illustrated) which surround the bearing caps mounted on the end of the respective trunnions to retain them therewith. The straps 42 are secured to the lug ears 38 by bolts 44 which can be threaded into the lug ears 38. The universal joint 24 provided between the output shaft of the transmission 12 and the end portion 22 of the driveshaft tube 18 has a similar structure.

Figure 4:
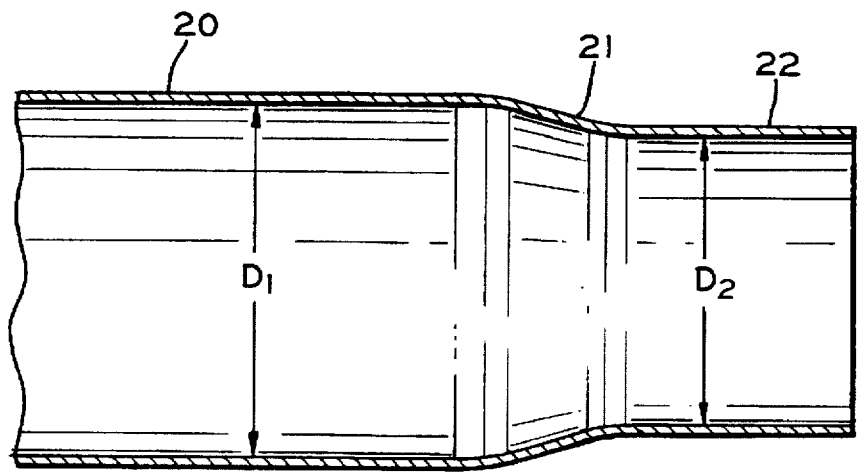
FIG. 4 is a cross-sectional view illustrating of one end of a driveshaft in accordance with this invention.

The structure of the driveshaft tube 18 of this invention is illustrated in more detail in FIG. 4. As shown therein, the center portion 20 of the driveshaft tube 18 defines an inner diameter $D_1$ which is larger than an inner diameter $D_2$ defined by the end portion 22 of the driveshaft tube 18. As discussed above, the transition region 21 extends between the larger center portion 20 of the driveshaft tube 18 and the end portion 22. Preferably, the inner diameter defined by the transition region 21 reduces in a smooth curve from the larger diameter center portion 20 to the smaller diameter end portion 22 for ease of manufacture and more uniform stress distribution. Referring back to FIGS. 2 and 3, it can be seen that the inner diameter $D_2$ of the end portion 22 of the driveshaft 18 is approximately the same as the outer diameter $D_3$ of the tube seat 28 provided on the tube yoke 26. Thus, the outer diameter $D_3$ of the tube seat 28 is smaller than the inner diameter $D_1$ of the center portion 20 of the driveshaft tube 18. Either one end portion 22 or both end portions 22 of the driveshaft 18 can be formed in this manner.

Preferably, the inner diameter $D_2$ of the end portion 22 of the driveshaft tube 18 is within the range of from about 73% to about 85% of the inner diameter $D_1$ of the center portion 20 of the driveshaft tube 18. Most preferably, the inner diameter $D_2$ of the end portion 22 of the driveshaft tube 18 is within the range of from about 78% to about 85% of the inner diameter $D_1$ of the center portion 20 of the driveshaft tube 18. In a specific preferred embodiment of the invention, the center portion 20 of the driveshaft tube 18 has an inner diameter $D_1$ of about five inches, while the end portion 22 of the driveshaft tube 18 has an inside diameter $D_2$ of about four inches. These dimensions provide an excellent unreinforced aluminum alloy driveshaft which facilitates access for tooling during assembly of the universal joint 24.

The method of forming the driveshaft tube 18 of this invention will now be explained. Initially, a driveshaft tube blank is provided having a predetermined first diameter. The driveshaft tube blank is initially heat treated to achieve a relatively soft temper and, therefore, a desired elongation factor. The driveshaft tube blank can be formed from any suitable material, but is preferably formed from an aluminum alloy metal. A preferred process for forming the driveshaft includes both extrusion and drawing. In this process, a solid aluminum alloy cylinder having about the desired length and diameter is placed into an extrusion press. A rod is forced through the middle of the solid aluminum alloy cylinder to form the internal diameter of the driveshaft tube blank. The aluminum alloy cylinder is then forced around an inner mandrel and through an extrusion die to form the extruded driveshaft tube blank. At this point, the shape of the driveshaft is close to the desired final shape. The extruded driveshaft is then subjected to a drawing operation to refine the dimensions and properties thereof. The process provides a hollow aluminum alloy driveshaft tube blank of the desired inside diameter, thickness, and amount of cold work. The inside diameter of the driveshaft tube blank at this point is equal to the inside diameter $D_1$ discussed above.

The above-mentioned heat treating operation can be performed during formation of the driveshaft tube blank, for example between the extrusion and drawing steps, or it can be performed after the driveshaft tube blank has been formed. The heat treated driveshaft tube blank will possess a desired elongation factor so that the end portions 20 can be reduced or swaged into a desired shape. Preferably, the elongation factor of the driveshaft tube blank after this heat treating operation is between about 15% and about 22%, and more preferably about 20%.

Figure 5:
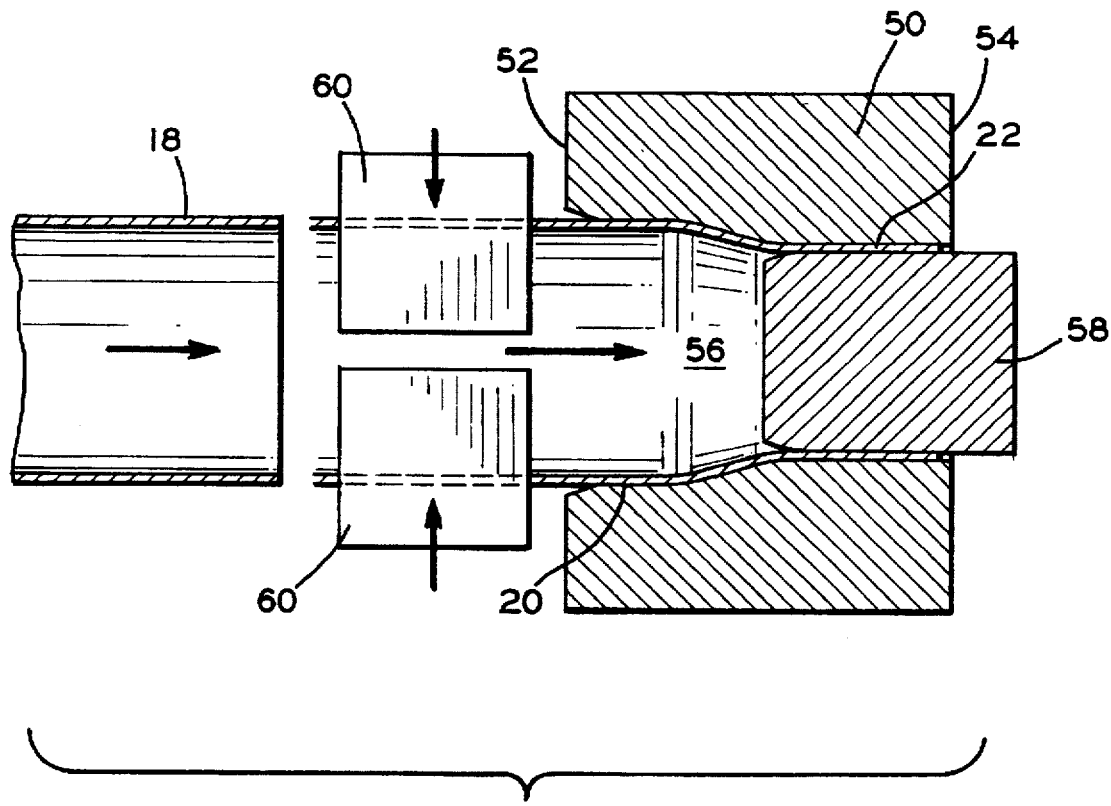
FIG. 5 is a schematic cross-sectional view of a push pointing operation for swaging the end portion of the driveshaft.

Taking advantage of this higher elongation factor for the material, the end portion 22 of the driveshaft tube blank is then swaged to reduce the diameter thereof to a second predetermined inside diameter. This reduced inside diameter is equal to the inside diameter $D_2$ discussed above. Any of the several well-known known methods for swaging metal can be used to form the end portions 20 of the driveshaft tube 18. A preferred method of swaging the end portion of the driveshaft is a push pointing operation, which is illustrated in FIG. 5. In this method, the driveshaft tube blank is pushed axially into a reducing push point die 50. The push point die 50 includes a front surface 52 which faces toward the driveshaft tube blank and a rear surface 54 which faces away from the driveshaft tube blank. A cylindrical opening 56 is formed through the push point die 50 having a larger diameter near the front surface 52 and a smaller diameter near the back surface 54. A mandrel 58 is positioned inside the opening 56 in the smaller diameter portion thereof. The mandrel 58 has an outer diameter which is equal to the desired inside diameter $D_2$ of the end portion 22 of the finished driveshaft tube 18. Grippers 60 are provided which engage the outer surface of the driveshaft tube blank and force it into the opening 56 of the push point die 50. As the driveshaft tube blank is pushed axially into the opening 56, the leading end thereof is reduced in diameter by engagement with the die 50 and the mandrel 58 to form the end portion 22 of the driveshaft tube 18. The remaining portion of the driveshaft tube blank retains the larger diameter size to form the center portion 20 of the driveshaft tube 18. Alternatively, the end portion 22 can be formed by rotary swaging. Rotary swaging employs a die which rotates while it alternately rapidly collapses and expands in a radial direction, much like a hammer. The end portion of the driveshaft is pushed into the die, and the die hammers the end portion of the driveshaft down into the desired reduced diameter.

After this swaging operation is performed, the driveshaft tube 18 is again heat treated by subjecting it to an elevated temperature for a predetermined time. This heat treatment is performed to achieve a relatively hard temper to meet the strength requirements for use. This produces a driveshaft 18 in accordance with the present invention.

Figure 2:
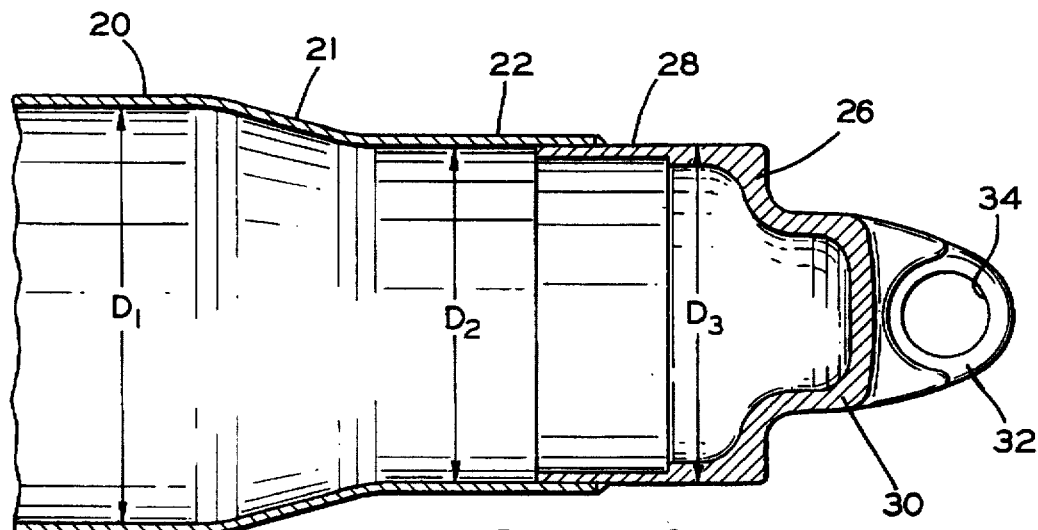
FIG. 2 is a side plan view, partially in cross section, of one end of a driveshaft in accordance with this invention connected to a tube yoke.

The end portion 22 of the driveshaft 18 is secured to the tube yoke 26 as shown in FIG. 2. Specifically, the tube seat 28 of the tube yoke 26 is inserted within the end portion 22 of the driveshaft 18. The inside diameter $D_2$ of the end portion 22 of the driveshaft 18 is preferably sized to be slightly smaller than the outside diameter $D_3$ of the tube seat 28. Preferably, the inside diameter $D_2$ of the end portion 22 of the driveshaft 18 is within the range of from about 98% to about 99.9% of the outside diameter $D_3$ of the tube seat 28 prior to the insertion of the tube seat 26 into the driveshaft tube 18. After such insertion, the tube seat 26 is slightly deformed since the outside diameter $D_3$ of the tube seat 28 equals the inside diameter $D_2$ of the end portion 22 of the driveshaft 18. By making the tube seat diameter $D_3$ slightly larger than the inside diameter $D_2$ prior to insertion of the tube seat 26 into the driveshaft tube 18, the two parts will have an interference fit or press fit which provides some torque transmitting capacity. The torque transmitting capacity of the connection between the driveshaft 18 and the tube yoke 26 is increased by providing a weld.

While the first and second predetermined diameters have been discussed hereinabove as inside diameters of the driveshaft, they could also be outside diameters if the tube yoke was secured outside the end portion of the driveshaft instead of fitting inside the end portion of the driveshaft.

It will be evident from the foregoing that various other modifications can be made to this invention. Such, however, are considered as being within the scope of the invention.

What is claimed is:

1. A drive line assembly comprising:

a driveshaft robe formed from a metallic material and including a homogeneous diameter reducing portion having a substantially uniform wall thickness, said diameter reducing portion including an axially extending cylindrical first end extending from said driveshaft tube, said diameter reducing portion further including an axially extending cylindrical second end, said axially extending cylindrical first end of said diameter reducing portion defining a first diameter, said axially extending cylindrical second end of said diameter reducing portion defining a second diameter, said first diameter being larger than said second diameter; and a tube yoke formed from a metallic material and including an axially extending cylindrical end portion having a substantially uniform wall thickness which is co-axial with and permanently fixed to said axially extending cylindrical second end portion of said diameter reducing portion of said driveshaft tube, said tube yoke further including a pair of opposed lug ears extending from said end portion and having respective orifices formed therethrough.

2. The drive line assembly defined in claim 1 wherein said driveshaft tube is formed from an aluminum alloy.

3. The drive line assembly defined in claim 1 wherein said tube yoke is formed from an aluminum alloy.

4. The drive line assembly defined in claim 1 wherein said driveshaft tube and said tube yoke are both formed from an aluminum alloy.

5. The drive line assembly defined in claim 1 wherein said diameter reducing portion of said driveshaft tube is welded to said tube yoke.

6. The drive line assembly defined in claim 1 wherein said first diameter is about five inches and said second diameter is about four inches.

7. The drive line assembly defined in claim 1 further including a universal joint assembly connected with said tube yoke.

\* \* \* \* \*

UNITED STATES PATENT AND TRADEMARK OFFICE
CERTIFICATE OF CORRECTION

PATENT NO. : 5,643,093
DATED : July 1, 1997
INVENTOR(S) : Douglas E. Breese

It is certified that error appears in the above-indentified patent and that said Letters Patent is hereby corrected as shown below:

Claim 1, Column 6, Line 2, after "driveshaft", change "robe" to -- tube --.

Signed and Sealed this

Second Day of September, 1997

*Attest:*

BRUCE LEHMAN

*Attesting Officer*      *Commissioner of Patents and Trademarks*